United States Patent [19]

Mihailovski

[11] 3,718,456
[45] Feb. 27, 1973

[54] HERBICIDAL METHOD EMPLOYING 4-CHLORO-1-NAPTHYL 2'-PROPYNYL ETHER

[75] Inventor: Alexander Mihailovski, Berkeley, Calif.

[73] Assignee: Stauffer Chemical Company, New York, N.Y.

[22] Filed: July 12, 1971

[21] Appl. No.: 161,990

[52] U.S. Cl. .............................. 71/124, 260/612 D
[51] Int. Cl. ................................................ A01n 9/24
[58] Field of Search ................... 71/124; 260/61.2 D

[56] References Cited

UNITED STATES PATENTS 3,131,166   4/1964   Harris et al. ..................... 71/124 X
2,897,241   7/1959   Watson ............................. 71/124 X Primary Examiner—Lewis Gotts
Assistant Examiner—Catherine L. Mills
Attorney—Daniel C. Block et al.

[57] ABSTRACT

The use of a 4-chloro-1-napthyl 2'-propynyl ether as a herbicide is disclosed.

1 Claim, No Drawings

HERBICIDAL METHOD EMPLOYING 4-CHLORO-1-NAPTHYL 2'-PROPYNYL ETHER

BACKGROUND OF THE INVENTION

This invention relates to the use of 4-chloro-1-naphthyl 2'-propynyl ether as herbicide. More particularly, the invention relates to herbicidal compositions containing 4-chloro-1-naphthyl 2'-propynyl ether, and a method of killing weeds employing 4-chloro-1-naphthyl 2'-propynyl ether.

SUMMARY OF THE INVENTION

The active ingredient of the compositions of the invention has the formula

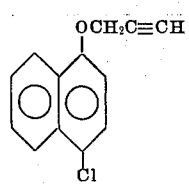

In general, the method of the invention comprises contacting vegetation or a locus to be protected with an amount of the active ingredient of the invention which is effective for the purpose intended.

DETAILED DESCRIPTION OF THE INVENTION

The active ingredient of the invention is prepared in the following manner. About 81.0 g. (0.454 mole) of 4-chloro-1-naphthol, 300 ml. of acetone, about 69.0 g. (0.500 mole) of anhydrous potassium carbonate, and about 60.0 g. (0.500 mole) of propargyl bromide are combined in a flask and are refluxed for about 5 hours. The resulting mixture is then filtered and the precipitate is washed with water. The filtrate is evaporated to dryness, and the residue is combined with the water insoluble portion of the precipitate to form a crude product. The crude product is dissolved in 200 ml. of benzene and washed twice with 100 ml. portions of 5 per cent sodium hydroxide solution. The solution is then dried and evaporated to produce 4-chloro-1-naphthyl 2'-propynyl ether, M.P. 79°–80° C. Structure is confirmed by analysis.

As previously indicated, 4-chloro-1-naphthyl 2'-propynyl ether is a phytotoxic compound which is useful and valuable in controlling various plant species. The compound was tested for herbicidal activity in the following manner:

Seeds of crabgrass, foxtail, watergrass, wild oats, pigweed, mustard and curly dock were planted in individual rows about one-half inch deep in sandy loam soil contained in 8 ¼ inches × 6 ½ inches × 2 ¾ inches flats. Enough seeds were planted to give about thirty to fifty plants of each of the weed species in each flat and the flats were watered after planting. The following day, each flat was sprayed at the rate of 20 pounds in 80 gallons of solution per acre of the compound of the invention. The flats were placed in a greenhouse at 80° F. and watered regularly. Two weeks later, the degree of weed control was determined by comparing the amount of germination and growth of each weed in the treated flats with weeds in several untreated control flats. A rating of 0 to 9 is given based on estimated injury or kill. The results of this test are reported in Table I.

TABLE I

| Crab-grass | Fox-tail grass | Water-grass | Wild Oats | Pig-weed | Mustard Weed | Curly Dock |
|---|---|---|---|---|---|---|
| 9 | 9 | 9 | 9 | 9 | 3 | 9 |

The active ingredient of the invention also exhibits activity against some weed species in post-emergent treatment.

The compound may be applied directly to the particular undesired plant species or may be applied to a locus to be protected. In either event, it is, of course, necessary that the unwanted species receive an effective dosage of amount, i.e. a herbicidal amount or an amount sufficient to kill or retard growth.

The active ingredient of the invention is normally employed with a suitable carrier and may be applied as a dust, spray, drench or aerosol. It thus may be applied in combination with solvents, diluents, various surface active agents (for example, detergents, soaps or other emulsifying or wetting agents, surface active clays), carrier media, adhesives, spreading agents, humectants and the like. It may also be combined with other biologically active compositions, including other herbicides, fungicides, bactericides and algaecides, insecticides, growth stimulators, acaricides, molluscicides, etc., as well as with fertilizers, soil modifiers, etc. The active ingredient of the invention may be used in combination with an inert carrier and a surface active or emulsifying agent and may also be applied in combination with other biologically active materials, in conjunction with a carrier and a surface active or emulsifying agent. The solid and liquid formulations can be prepared by any of the conventional methods well known by those skilled in the art. Determination of the optimum effective concentration for a specific application is readily conducted by routine procedures, as will be apparent to those skilled in the art. As indicated, the amount applied in a given case will be an effective amount, i.e., an amount sufficient to give the type of control desired.

Various changes and modifications may be made without departing from the spirit and the scope of the invention described herein, as will be apparent to those skilled in the art to which it pertains.

I claim:

1. A method of killing weeds comprising applying an effective amount of a compound having the formula

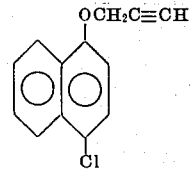

to the weeds or to a locus to be protected.

* * * * *